(No Model.)
E. L. ARNOLD.
NUT LOCK.
No. 493,393. Patented Mar. 14, 1893.
FIG. 1.
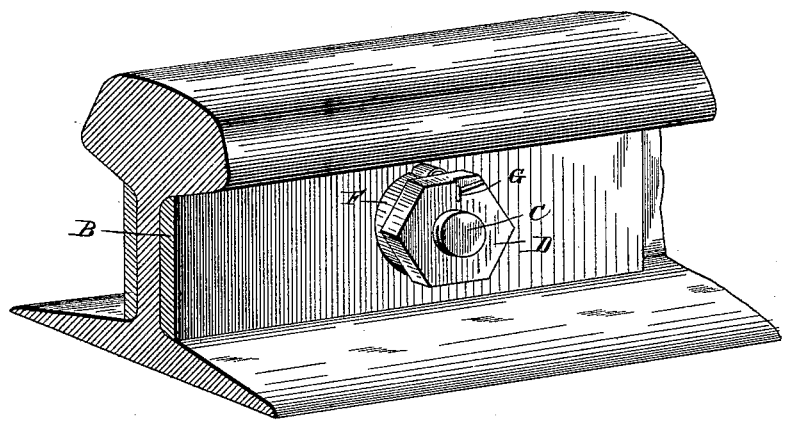
FIG. 2. FIG. 3.
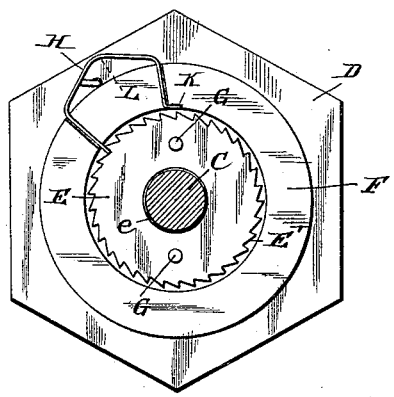 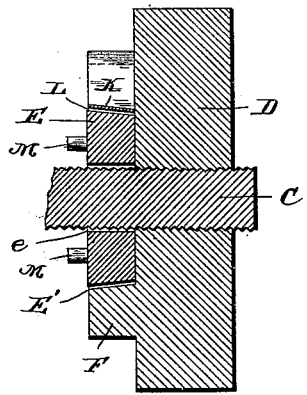
FIG. 4. FIG. 5.
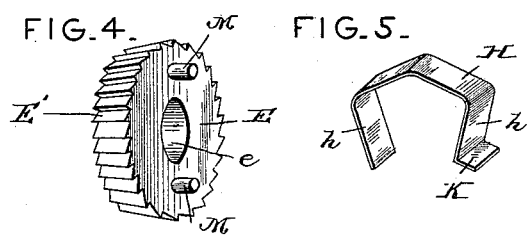
Witnesses Inventor
Harry L. Amer. Elipholet Lester Arnold.
By his Attorneys,

United States Patent Office.

ELIPHALET LESTER ARNOLD, OF GEORGETOWN, TEXAS.

NUT-LOCK.

SPECIFICATION forming part of Letters Patent No. 493,393, dated March 14, 1893.

Application filed September 17, 1892. Serial No. 446,159. (No model.)

*To all whom it may concern:*

Be it known that I, ELIPHALET LESTER ARNOLD, a citizen of the United States, residing at Georgetown, in the county of Williamson and State of Texas, have invented a new and useful Nut-Lock, of which the following is a specification.

My invention relates to improvements in nut locks, of the class known as "spring and ratchet," the object of my improvement being to provide a simple, cheap and easily operated nut lock, which may be manipulated to release the nut without injury to any of the parts, and in which the locking means are concealed and protected while in the operative positions.

Further objects and advantages of my invention will appear in the following description, and the novel features thereof will be particularly pointed out in the appended claim.

In the drawings: Figure 1 is a perspective view of a bolt and nut provided with my improved locking devices, applied to a railroad rail. Fig. 2 is a rear view of the bolt and the ratchet washer, with the bolt shown in transverse section. Fig. 3 is a sectional view taken parallel with the axis of the bolt. Fig. 4 is a detail view, in perspective, of the washer. Fig. 5 is a similar view of one of the locking springs.

In order to illustrate the application of my invention I have shown it in connection with a rail, supposed to be the end of one of a pair of connected or jointed rails, A representing such rail, and B the fish-plate.

C represents one of the bolts which are used to connect the fish-plate to the rails, and D the nut which is threaded upon said bolt.

E represents an annular washer, trunco-conical in shape which is arranged in contact with the fish-plate, around the bolt, (being provided with a central perforation, e, to receive said bolt,) with its base resting upon said plate and its conical sides provided with ratchet-teeth, E', as shown clearly in Fig. 4.

The nut is provided upon its rear or underside with an annular boss, or ring, F, the interior diameter of which is slightly greater than the exterior diameter of the ratchet washer, and is beveled to correspond therewith and lie at an equal distance therefrom at all points. As shown in the sectional view, Fig. 3, the depth of the annular boss is slightly less than that of the washer, whereby the former will not bind upon the fish-plate before the rear or under side of the nut-proper bears firmly against the outer surface of the washer. This boss is preferably integral with the nut and is of less diameter than the nut, whereby it is concealed and protected thereby, and allows the contour of the nut to remain unbroken throughout so as not to interfere with the application of a wrench or other operating tool. Radial kerfs, G G, arranged in pairs at opposite sides, are formed in the annular boss, the members of each pair of kerfs being arranged in proximity to each other, as shown clearly in the rear view, Fig. 2.

H H represent the locking springs, approximately U-shaped, with the side-arms, h h, arranged at an angle to fit in the radial kerfs in the annular boss. One arm of the spring is bent laterally at its terminal to form a catch, K, to engage the inner surface of the boss, and the other arm is extended inward, beyond the inner surface of the boss to form the engaging point of the spring. The looped or closed end of the spring is convexed more sharply than the outer surface of the boss, so as to bulge beyond the same to form a pocket, L, as shown in Fig. 2, in which to insert a small instrument to withdraw the engaging end of the spring from the teeth of the washer. The washer is provided upon its underside with a perpendicular dowel or stud, M, to engage a corresponding depression or socket in the fish-plate, to prevent rotation of the washer.

Having thus described my invention, what I claim, and desire to secure by Letters Patent of the United States, is—

In combination with a bolt, an annular, trunco-conical washer surrounding said bolt and provided upon its beveled outer surface with ratchet-teeth, the nut provided with an annular boss to fit loosely over said washer and having a beveled inner surface to correspond therewith, and the locking-springs fitting in kerfs in said boss to engage the teeth upon the periphery of the washer, substantially as specified.

In testimony that I claim the foregoing as my own I have hereto affixed my signature in the presence of two witnesses.

ELIPHALET LESTER ARNOLD.

Witnesses:
EDWARD TAYLOR,
JNO. W. ELLYSON.